Sept. 8, 1970  K. R. DETJEN  3,527,416

SHREDDING DEVICE

Filed Jan. 4, 1967  2 Sheets-Sheet 1

Kenneth R. Detjen
INVENTOR

BY Arnold & Roylance
ATTORNEYS

Sept. 8, 1970  K. R. DETJEN  3,527,416
SHREDDING DEVICE
Filed Jan. 4, 1967  2 Sheets-Sheet 2
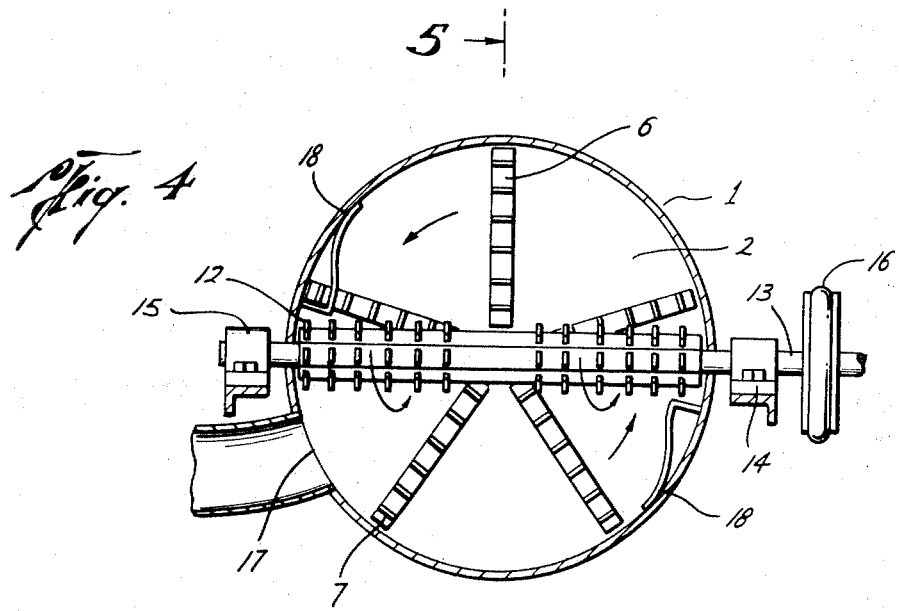
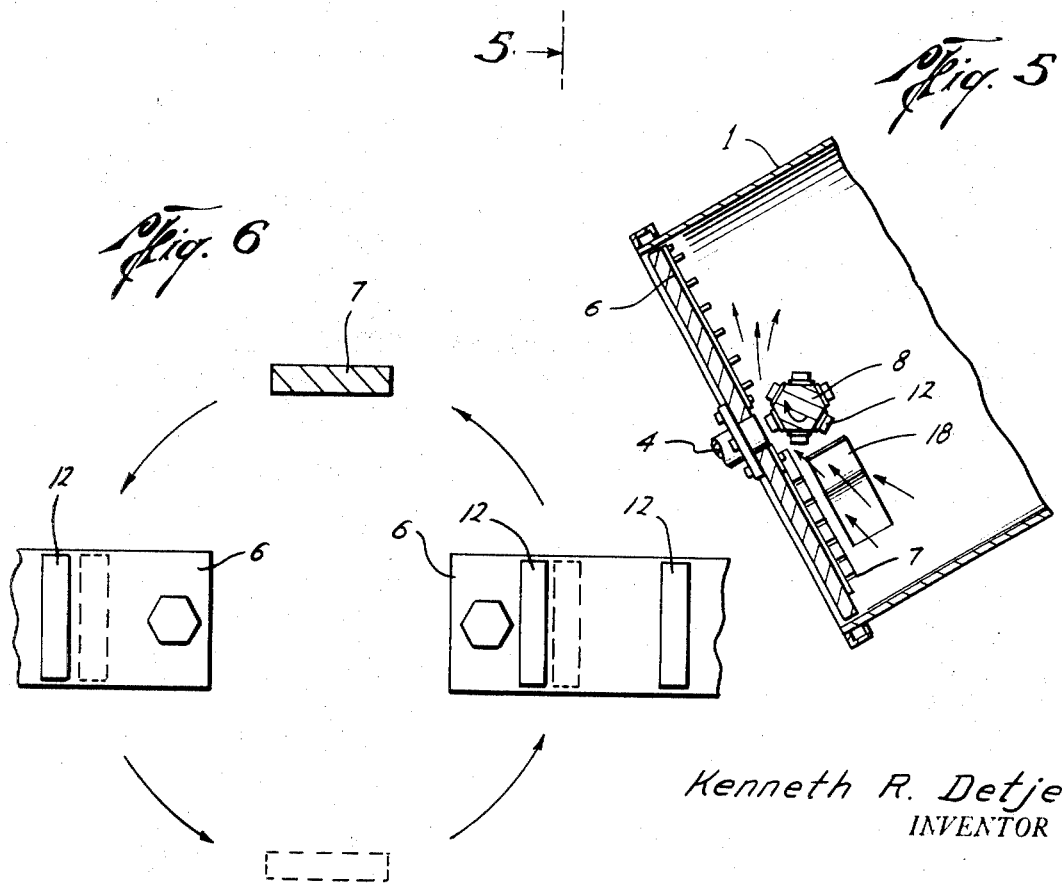
Kenneth R. Detjen
INVENTOR
BY Arnold & Roylance
ATTORNEYS United States Patent Office 3,527,416
Patented Sept. 8, 1970

3,527,416
SHREDDING DEVICE
Kenneth R. Detjen, 1100 N. Peggy Drive,
Waco, Tex. 76706
Filed Jan. 4, 1967, Ser. No. 607,276
Int. Cl. B02c 7/00, 15/00, 23/00
U.S. Cl. 241—60                                          8 Claims

ABSTRACT OF THE DISCLOSURE

A device for shedding or disintegrating cardboard, paper, or like material has a heavy rotatable plate mounted with teeth to provide a first planar cutting means. A feeder bar disposed above and across the plate as a diameter of the plate is rotatable about an axis parallel to the plate and also is provided with teeth which extend into the spaces between the teeth on the inertial plate. The relative velocities of these two components of the structure is such that the teeth on the inertial plate move rapidly past the teeth on the feeder bar and thereby disintegrate material caught therebetween. The rotation of the feeder bar cooperating with the movement of the plate serves to draw the material to be shredded between the two members for the shredding operation.

---

The instant invention relates to a novel device for the shredding and breaking of materials. More particularly, the instant invention provides a novel device for the breaking and shredding of carboard, paperboard, fiberboard, and the like.

Waste cardboard and corrugated board, which accumulates in significant quantity during the manufacture of the board itself or in the manufacture of boxes, has considerable salvage value as stock for reprocessing in the manufacture of paper and in the production of wallboard. However, the waste pieces are by their nature nonuniform in size, and sometimes quite large. The efficiently and profitably ship such waste material for reprocessing, such salvage cardboard must be shredded to reduce its bulk and to enable it to be effectively packaged or baled.

A variety of devices have been used by the prior art to carry out such shredding operations. For example, hammer mills which use a series of reciprocating hammers to puncture and tear the cardboard are often employed. Other shredding devices employing a series of interspaced tooth wheels are also well known by the art. The multiplicity of moving parts in such devices renders them expensive to purchase, and necessitates the use of high horsepower prime movers for their operation; thus escalating costs of operation.

There is accordingly provided by the instant invention a simple, rugged, and economical device for shredding materials such as carboard, corrugated board, and the like.

There is further provided in accordance with this invention such a novel device which performs the shredding operations while requiring a great deal less horsepower than have prior art devices.

There is further provided in accordance with this invention a novel shredding device whch may be efficiently employed in conjunction with an automatic baler.

There is further provided in accordance with this invention such a novel shredding device suitable for the shredding of sheetlike material which is essentially self-feeding and which does not require attendance as to the method of feeding.

Thus there is provided in accordance with this invention a novel shredding device which comprises a first cutting means disposed on a surface which is movable in a plane corresponding to the plane of said surface and a second cutting means disposed across said surface and rotatable about an axis which is coextensive with said surface, with the second cutting means disposed proximate the first cutting means for shredding material therebetween.

When reference is made above to a surface and the plane of that surface, it is to be understood that the geometrical planarity of the surface is not important. Rather the instant invention provides a shredding device which has one cutting means which moves in a planar manner with the cutting elements disposed on the face of the plane, with the second cutting means rotatable across the face of the plane having cutting elements disposed longitudinally along the axis of rotation. Thus the first cutting means can comprise a plate with teeth, or teeth mounted on a support structure of some type, for example on a gridwork or on spokes of a wheel. Thus the surface on which first cutting means are disposed need not be a continuous one. For example, the novel shredding device of this invention utilizes one planar-rotating cutting member and an axially rotating cutting member close to the planar member such that cutting elements on each shred material pass therebetween. The axially rotating cutting member may be a cylinder or the like having peripheral cutting elements disposed upon an axis parallel to the plane of rotation of the planar rotating cutting means or on a nonparallel axis at an angle to the planar rotating cutting member. Where the second axially rotating cutting member is disposed at such an angle, the cutting elements still preferably extend to a point proximate the cutting elements on the face of the planar rotating member. When the axis is at an angle to the planar rotating member, the cutting portion of the axially rotating member can be generally said to be arranged conically or frusto-conically along the axis of rotation thus producing a conical or frusto-conical surface or rotation.

The axially rotating cutting member traverses at least a portion of the planar rotating member. For example, the axially rotating member may extend entirely across the planar rotating member in the nature of a diameter, or from the edge of the planar rotating member to its center of rotation, in the nature of a radius. Further, the axially rotating member need not traverse the planar rotating member in a radial manner at all, but rather can traverse the rotating surface in a chordal manner without crossing the center of rotation.

It will be appreciated that novel shredding devices in accordance with this invention can be made employing a number of axially rotating members traversing a single planar rotating member while using the principles herein.

In accordance with the specific embodiment illustrated, there is provided in accordance with the instant invention a novel shredding device having cutting elements comprising a plate which is rotatable and which has cutter teeth, and an axially rotatable feeder bar extending across said plate having cutter teeth interspaced with the teeth on said rotating plate and extending in the spaces therebetween. In the embodiment shown, feeder bar rotates on an axis parallel to the plane of rotation of the base plate, and at least a portion of said feeder bar rotates in a direction such that its motion and that of the rotating plate coact to draw material between the feeder bar and the rotating base plate. Alternatively, the axis of the feeder bar could be at an angle to the plate with the cutter teeth on the feeder bar forming a conical or frusto-conical outline.

Although the disclosure herein is primarily directed toward the applicability of the novel device of the instant invention to the shredding and breaking of cardboard, corrugated board, and the like, it will be understood that the instant novel device may be also employed for the shredding of other suitably textured materials. Thus when the device herein is referred to as a shredding device, it will be understood that its function is to shred, rip, disintegrate, or generally break down various types of material.

The instant invention will be more explicitly understood with reference to the accompanying drawings which illustrate a device in accordance with a specific embodiment of the instant invention.

FIG. 4 is a top sectional view taken through line 4—4 on FIG. 2.

FIG. 5 is a side sectional view taken along line 5—5 on FIG. 4.

FIG. 6 is a schematic drawing illustrating one method of interspacing the teeth on the rotating plate and the ripper bar.

Figure 1:
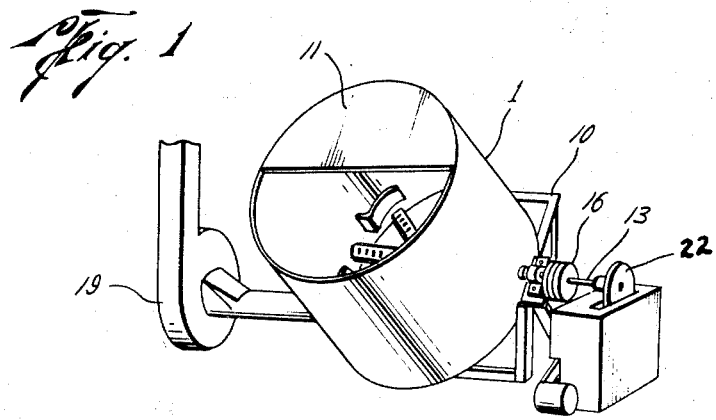
FIG. 1 is a perspective view showing the novel device in accordance with this invention mounted for operation.

Referring now specifically to the drawings, there is shown a novel device in accordance with one embodiment of this invention. Container 1 suitable for receiving the salvage cardboard to be shredded has a toothed rotating base plate 2, the power for the rotation of which is supplied by a prime mover such as motor 3. Feeder bar 8 is illustrated as a toothed hexagonal shaft extending as illustrated across rotary base plate 2 substantially as a diameter with the teeth 12 on the feeder bar 8 interspaced with and extending into the spaces between the teeth 7 on said rotary base plate 2.

In the embodiment illustrated, most effective operation of the device is obtained by rotating the base plate 2 in a counterclockwise direction when viewed as in FIG. 4 from the top, and rotating the feeder bar about an axis parallel to the plane of rotation of the base plate and in a clockwise direction when viewed from the direction shown in FIG. 5. Arrows in the center portion of the feeder bar and on the base plate indicate their respective directions of rotating motion.

In operation, the rotating base plate 2 is preferably rotated at an angular velocity considerably in excess of the angular velocity of the feeder bar 8. For example, the base plate may be rotated at speeds of about two hundred revolutions per minute and higher while the feeder roll may be maintained at a speed generally less than ten revolutions per minute. The comparative rotative speeds result in the shredding action and flow pattern of the material being shredded illustrated by the arrows on FIGS. 2 and 5.

With specific reference to FIG. 5, there is shown a sectional view of the right-hand half of the shredding device shown in FIG. 4. It will be noted that by virtue of the relative directions of rotation of base plate 2 and feeder bar 8 that the teeth 12 of the feeder bar at the points of their closest approach to the rotating plate are moving in essentially the same direction as teeth on the rotating plate, although at considerably different velocities. The coaction of the teeth on the feeder bar and the base plate serves to draw the material to be shredded between the teeth of the feeder bar and the base plate as shown by the arrows on FIG. 5 and accordingly subject this material to a shredding action. For purposes of reference, the portion of the feeder roll which coacts with the base plate in such a manner will be referred to as the "feeder" portion of the feeder roll. The speed differential between the teeth results in the feeder bar teeth gripping and holding portions of the material being shredded while the fast moving base plate teeth interspaced with the feeder bar teeth rip and tear during their rapid passage under the feeder bar.

Figure 2:
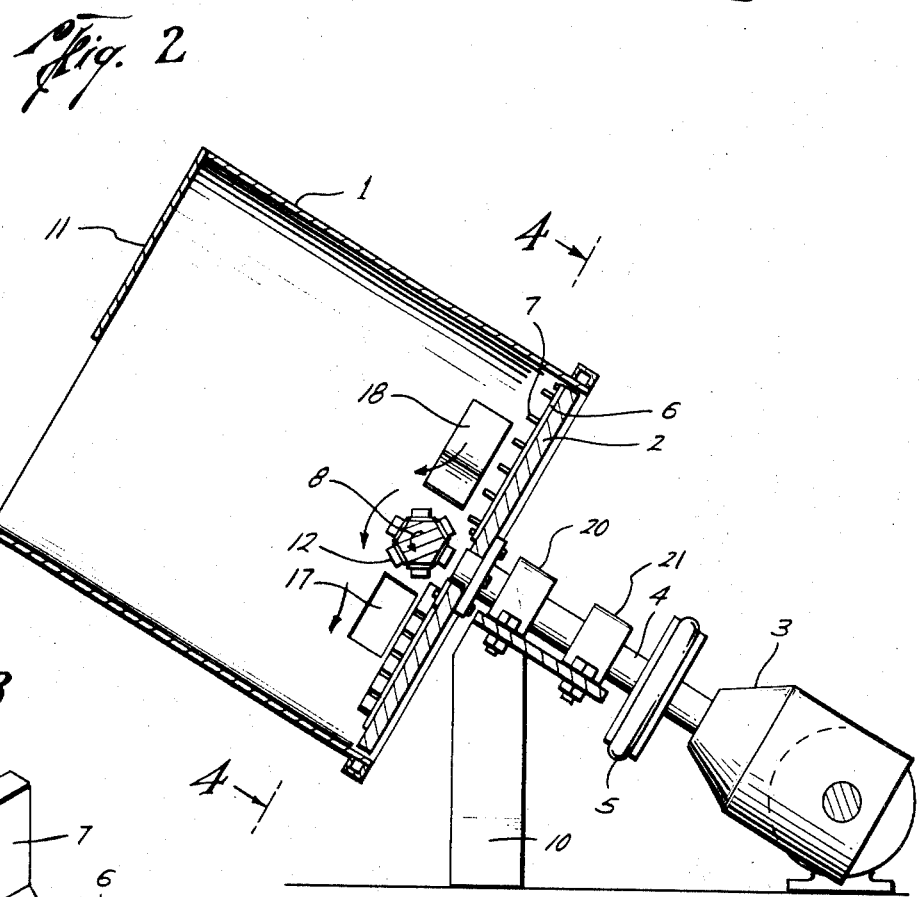
FIG. 2 is a side elevation section of the shredding device shown in FIG. 1.

On the opposite side of the container, quite a different phenomenon occurs in the operation of the particular device illustrated. Following the shredding between the feeder bar and the rotary plate 2 as illustrated in FIG. 5 the shredded material is swirled to the opposite side of container 1. It will be noted that the relative directional motion of the feeder bar 8 and rotating base plate 2 on the opposite side of container 1, as illustrated in FIG. 2 is such that at the point of closest approach to the base plate the teeth 12 on the feeder roll are moving in a direction substantially opposite the movement of the teeth 7 on the base plate. Thus, on this side of the container the feeder roll does not coact with the base plate to draw material under the feeder roll but tends rather to reject material from passage under the feeder roll. In operation, it has been observed that the larger pieces of material which have survived the initial pass under the feeder roll without being sufficiently finely shredded will be rejected or kicked away by the feeder roll at this point, and will follow the path of the arrows in FIG. 2. These larger pieces continue their swirling travel around the container for an additional shredding pass between the feeder roll and the base plate at the "feeder" portion of the feeder roll. Smaller pieces, however, will generally pass under the feeder roll again despite the tendency of the feeder roll to reject and will be further shredded. These smaller pieces passing under the feeder roll on the side illustrated in FIG. 2, termed for reference herein as the "reshred" portion, of the feeder roll are then readily removed from the drum through exit port immediately downstream of the reshred portion of the feeder bar through which a suction is drawn as will be hereinafter explained.

Returning to FIG. 1, there is illustrated a novel device in accordance with one embodiment of this invention in an operational arrangement. Container 1 is held in an inclined position, at about 45° from the vertical, by frame 10. A material retainer plate 11 is affixed over the upper part of the opening and decreases the chance of expulsion of material during operation. The container in this position affords a readily accessible opening into which the material to be shredded may be placed and also, from a safety standpoint greatly decreases the danger of operator injury. In operation, the incline of the container appears to contain the swirling material being shredded very well with virtually no expulsion thereof. In the arrangement illustrated, the sheet cardboard may be simply thrown into the container indiscriminately, and gravity together with the rotation of the base plate will serve to feed the material properly under the feeder roll without attendance. The container may be mounted vertically and in such instances it has been found somewhat advantageous to use a container of frusto-conical shape having an upper opening smaller than the diameter of the rotating base plate since it has been found that the air motion in the container and the centrifugal force of the swirling material tends to combine to force material up the walls of container 1 and to expel material when the container is vertical rather than inclined.

The rotating base plate 2 is powered for rotating by motor 3, for example an electric motor, through shaft 4 mounted in bearings 20 and 21 which are affixed to a portion of frame 10. A shock absorbing bushing 5 aids in insulating the motor 3 from the shock encountered by rotating plate 2 in the shredding operation. The rotating base plate is preferably constructed to have sufficient mass so that it will act as in inertial plate and function as a flywheel to preserve the momentum of the device. This is extremely helpful to efficient operation with moderately small prime movers. For example, in an operational device for the shredding of standard gauge of corrugated board and the like the rotating base plate is preferably constructed from at least one-half inch, and preferably one to one and one-half inch steel plate or the like and by virtue of this construction becomes an inertial member.

The instant novel device, by virtue of the flywheel effect which is a result of the novel design enables use of considerably lower horsepower prime movers for operation.

For example, to shred commercial paper corrugated board, the instant device can employ a five horsepower motor, while prior art hammer mills and the like required 40 to 50 horsepower for shredding the same material.

Figure 3:
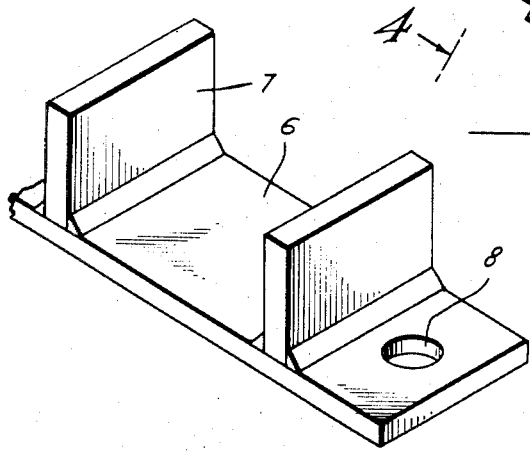
FIG. 3 is a perspective view showing the nature and construction of the cutting teeth employed in the device illustrated.

The rotating plate 2 is mounted with cutter bars 6, each cutter bar having a series of cutter teeth mounted thereon. FIG. 3 illustrates teeth 7 welded to cutter bar 6 which has a bolt-hole 8 to facilitate mounting of the cutter bars on the rotating plate 2. Although the teeth may be mounted directly on the rotating base plate for example by welding, providing their detachability as illustrated facilitates repair in the event of breakage or wear. It will be noted that cutter teeth 7 and 12 on both the base plate 2 and the feeder bar 8 do not require sharp cutting edges since their function in the cardboard shredder illustrated is to rip rather than cut cleanly. The retention of a sharp edge in applications where heavy cardboard is being shredded would be difficult if not impossible; however, in adaptations of this device for lighter shredding work the cutter teeth may be variously designed as will be apparent to those skilled in the art.

Furthermore, the use of distinct teeth as illustrated is not essential to this invention. Any type cutting surface which together with the cutting surface of the axially rotating feeder bar accomplishing the shredding action can be used.

In the illustrated embodiment, the five cutter bars 6 mounting the cutter teeth 7 are arranged radially on the base plate. Radial mounting is not essential, although this arrangement facilitates the interspacing of teeth on the feeder roll and the plate. Use of an odd number of equally spaced cutter bars insures that two cutter bars are never simultaneously directly below both sides of the feeder roll. This design minimizes the shock which may be encountered by the device in shredding and hence is preferred. However, any arrangement of teeth on the base plate, preferably a design minimizing shock, may be used wherein the combined action of these teeth with those on the feeder roll produces the desired shredding action.

Feeder roll 8 is illustrated as a hexagonal shaft mounting teeth 12 similar to the base plate teeth 7. The teeth on the feeder roll are interspaced between the teeth on the base plate and extend into the spaces between said base plate teeth. The feeder roll is mounted through the walls of container 1 and is rotated by a second prime mover or through a power takeoff linkage 22 from motor 3. The feeder roll is powered through shaft 13 provided with shock bushing 16 to insulate the power takeoff or motor from shock. The shaft of the feeder roll is secured at each end with bearings 14 and 15. As pointed out hereinbefore, the feeder roll could be conically or frusto-conically shaped, rotating on an axis at an angle to plate 2. In such an arrangement, a similar power takeoff could be used.

In addition, there are provided on the inner wall of container 1 flow guards 18 at the level in the container where the feeder roll 8 passes through the container wall. These flow guards 18 serve to prevent the accumulation of shredded material between the rotating feeder roll and the container wall, which could jam and damage the apparatus. Of course, the flow guards are placed on what may be called the upstream side of the feeder roll, i.e., the direction from which the shredded material approaches the feeder roll in its swirling travel around the inside of container 1.

A specific preferred arrangement for the cutting teeth is illustrated schematically in FIG. 6. Teeth 12 represent the position of the feeder roll teeth rotating in a plane perpendicular to the illustration surface while tooth 7 represents the teeth on the base plate rotating in the plane of the illustration surface. As shown in FIG. 6, it is preferred that as each tooth 7 in the base plate rotates past the interspaced teeth the feeder roll, the tooth spacing be such that each of the two side surfaces of tooth 7 are alternately passed proximate the feeder roll teeth on opposite sides of the feeder roll. Such an arrangement tends to eliminate the accumulation of debris in the teeth of both the feeder roll and the base plate.

After the shredded material has been reduced to the desired size, it may be removed from the container through an exit port 17 through which a suction is drawn. A suction fan mounted in the housing at 19 provides sufficient force to draw the shredded material from the container and propel it directly to an automatic baler or like device. The exit port in the embodiment of the instant novel device illustrated in the drawings is located immediately downstream of the reshred portion of the feeder roll close to the rotating base plate such that the majority of the material removed through the exit port is material which has been shredded under both the feeder portion and the reshred portion of the feeder roll. It has been found that the swirling velocity of material being shredded in this device is quite high and accordingly the exit port is not likely to become clogged or jammed with large pieces of shredded material by virtue of the velocity of the material itself and by virtue of impact of pieces tending to clog the exit port with free swirling material. Accordingly, a measure of control of the size of removed shredded material may be exerted merely by adjustment of exit port size. Other methods for controlling ultimate shred size will be discussed hereinafter.

It is pointed out that in its simplest operational embodiment, the instant novel device may employ a feeder roll which has only a feeder portion, and no reshred portion at all. For example, the feeder roll could be affixed at its nonpowered end to a bearing secured through the center of the rotary plate 2. The exit port as such could be located in a position similar to that illustrated or indeed at any position downstream of the feeder portion of the feeder roll. Of course, such a device would not afford the material the same opportunity as the illustrated device for two shredding passes under the feeder roll, but would produce shredding and would feed without attendance.

The positioning of the teeth and the relative speeds of the rotary plate may be suitably adjusted to regulate the ultimate size of shredded material. Normally, as stated hereinbefore, the rotary base plate is rotated at speeds of about two hundred revolutions per minute or more, and the feeder roll is maintained at a considerably lower speed, e.g., from five to ten revolutions per minute. The degree of shredding is increased as the rotary speed of the rotary base plate is increased, but the shredding is decreased as the speed of the feeder bar increases since the material is hastened under the feeder bar by such speed increase. It can be appreciated that to provide the coaction for the feeder portion of the feeder roll, the feeder roll must be rotated to some degree and generally, regradless of the base plate speed the feeder roll is maintained at the speeds as indicated above.

Degree of shredding may also be increased by adjustment of the interspacings of the teeth on the feeder roll and the rotating base plate, by increasing the number of cutter bars of teeth on the base plate and the like.

Although this device has been described and illustrated largely with reference to an embodiment for the shredding of comparatively heavy material such as cardboard, corrugated board or the like, it will be obvious that the principles herein can be adapted to produce various shredding devices designed for different materials. For example, in accordance with this invention, there can be readily provided a desk-top shredder for destruction of paper, or a shredder for the disintegration of organic materials and the like.

What is claimed is:
1. A shredding device comprising:
 (a) a container;
 (b) an intertial plate having teeth, said plate comprising the base of said container, and being adapted for rotation in a plane corresponding to the plane of said plate;
(c) means for rotating said plate;
(d) a feeder bar having teeth adapted to extend into the spaces between the teeth on said plate, said feeder bar being adapted to rotate about an axis parallel to said plate, at least a portion of said feeder bar rotating in a direction such that its rotation and that of said plate coact to draw material between said feeder bar and said plate; and
(e) means for rotating said feeder bar at an angular velocity less than the angular velocity of said plate.

2. The shredding device of claim 1 wherein said feeder bar extends in its length substantially across said plate with the mid-point of said feeder bar being substantially over the center of rotation of said plate, said feeder bar being mounted with teeth on both sides of said mid-point.

3. The device of claim 2 wherein the teeth on said plate are arranged such that teeth on said plate do not simultaneously pass under the feed bar on both sides of its mid-point.

4. A shrredding device comprising:
(a) a container of round cross section;
(b) a circular inertial plate having teeth comprising the base of said container, said plate being adapted for rotation in a plane;
(c) means for rotating said plate;
(d) a feeder bar having teeth adapted to extend into the spaces between the teeth on said plate, said feeder bar being adapted to rotate about an axis extending across said plate as a diameter thereof parallel to said plate, at least a portion of said feeder bar rotating in a direction such that its rotation and that of said plate coact to draw material between said feeder bar and said plate;
(e) means for rotating said feeder bar at an angular velocity less than the angular velocity of said plate; and
(f) means exerting suction and adapted to remove shredded material from said container.

5. The device of claim 4 wherein said container is equipped with an exit port located at approximately the level of said feeder bar through which said means exerting suction draws shredded material from said container.

6. A device suitable for shredding which comprises:
first cutting means having cutting members disposed on a surface which is movable in a plane corresponding to the plane of the surface, and
second rotatable cutting means having cutting members disposed longitudinally along an axis of rotation, said members extending across at least a portion of the movable surface of said first cutting means proximate said first cutting means,
said cutting members of said first cutting means and said second rotatable cutting means being interspaced such that the cutting members on said first cutting means extend into the spaces between the cutting members on said second rotatable cutting means.

7. A device suitable for shredding which comprises:
first cutting means disposed on a surface and rotatable in a plane corresponding to the plane of the surface,
second cutting means rotatable about an axis parallel with the plane of rotation of said surface which extends over the center of rotation of said surface,
means to rotate said first cutting means, and
means to rotate said second cutting means in a direction such that the second cutting means and the first cutting means will coact to draw material between said first and said second cutting means to shred the material.

8. A device suitable for shredding which comprises:
first cutting means disposed on a surface which is rotatable in a plane corresponding to the plane of the surface, and
a second cutting means rotatable about an axis parallel to the surface of said first cutting means and extending over the axis of rotation of said first cutting means,
said second cutting means being disposed substantially across the entire rotating width of said first cutting means.

References Cited

UNITED STATES PATENTS

| 31,451 | 2/1961 | Garner | 241—220 |
| 226,234 | 4/1880 | Lampert | 241—261 |
| 1,760,245 | 5/1930 | Lykken | 241—186 X |

FOREIGN PATENTS

| 1,149,229 | 5/1963 | Germany. |

LESTER M. SWINGLE, Primary Examiner

D. G. KELLY, Assistant Examiner

U.S. Cl. X.R.

241—220